United States Patent
Falace et al.

(10) Patent No.: US 6,669,431 B1
(45) Date of Patent: Dec. 30, 2003

(54) ROBOTIC DOCKING APPARATUS FOR A CARTRIDGE LIBRARY SYSTEM HAVING A CARTRIDGE STORAGE ARRAY

(75) Inventors: Joseph P. Falace, Louisville, CO (US); Joseph P. Manes, Arvada, CO (US); Daniel J. Plutt, Superior, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 08/879,638

(22) Filed: Jun. 20, 1997

Related U.S. Application Data

(63) Continuation-in-part of application No. 08/751,183, filed on Nov. 15, 1996, now Pat. No. 5,848,872.

(51) Int. Cl.[7] .............................................. B65G 63/00
(52) U.S. Cl. ...................................... 414/280; 360/92
(58) Field of Search ............................... 414/268, 269, 414/270, 280; 360/92

(56) References Cited

U.S. PATENT DOCUMENTS

| | | | | |
|---|---|---|---|---|
| 2,941,739 A | * | 6/1960 | Burke et al. ................... | 360/92 |
| 3,584,879 A | | 6/1971 | Itsuki Ban ....................... | 274/4 |
| 3,938,190 A | * | 2/1976 | Semmlow et al. ............. | 360/92 |
| 4,742,405 A | | 5/1988 | Teranishi ....................... | 360/92 |
| 4,989,191 A | | 1/1991 | Kuo ............................. | 369/33 |
| 5,065,265 A | | 11/1991 | Pierrat ........................... | 360/92 |
| 5,242,259 A | | 9/1993 | Yeakley ........................ | 414/751 |
| 5,402,283 A | * | 3/1995 | Yamakawa et al. ............ | 360/92 |
| 5,487,579 A | * | 1/1996 | Woodruff ...................... | 414/753 |

FOREIGN PATENT DOCUMENTS

EP 0 709 169 A2 5/1996 ............. B25J/15/08

* cited by examiner

Primary Examiner—Thomas J. Brahan
(74) Attorney, Agent, or Firm—Wayne P. Bailey

(57) ABSTRACT

The robotic docking apparatus for a cartridge library system having a cartridge Storage array provides a docking apparatus on the robotic arm that mates with corresponding features on the storage compartments. The docking apparatus enables the cartridge retrieval mechanism to automatically and precisely align with the storage compartment that contains the selected data cartridge by using passive alignment mechanisms and without requiring the use of a vision system or expensive tight mechanical tolerances. The robotic docking apparatus is incorporated into the robotic arm in the form of a docking feature that protrudes from the front of the cartridge retrieval mechanism. The docking feature is of length sufficient to begin engagement of the mating docking receptacle formed in each of the storage compartments in the storage array prior to the remainder of the cartridge retrieval mechanism contacting the data cartridge stored therein. The docking feature is tapered in shape, being narrower in width at the distal end thereof, so that as the reach mechanism of the robotic arm extends the cartridge retrieval mechanism toward the storage compartment the taper of the docking feature forces the cartridge retrieval mechanism into alignment with the docking receptacle.

5 Claims, 7 Drawing Sheets

ROBOTIC DOCKING APPARATUS FOR A CARTRIDGE LIBRARY SYSTEM HAVING A CARTRIDGE STORAGE ARRAY

CROSS-REFERENCE TO RELATED APPLICATIONS

This application is a continuation-in-part of U.S. patent application Ser. No. 08/751,183, titled "Apparatus for Handling Cartridges in a Storage Library System", filed Nov. 15, 1996 now U.S. Pat. No. 5,848,872.

FIELD OF THE INVENTION

The present invention pertains to the field of cartridge library systems for the automated storage and retrieval of data cartridges. More specifically, the cartridge library system includes at least one array of storage compartments that stores data cartridges for presentment to a robotic arm, which robotic arm includes a docking apparatus that mates with a corresponding feature on the array of storage compartments to ensure accurate alignment of the cartridge retrieval mechanism with the data cartridge.

PROBLEM

It is a problem in the field of robotic cartridge library systems to provide an inexpensive yet reliable robotic arm to transfer data cartridges between their storage compartments and the drives that are used to read, write, and erase data that is stored on the data storage medium contained therein. In particular, it is a problem to reduce the dependence in such systems on the tight mechanical tolerances and vision systems that are required to precisely position the hand mechanism, located at the distal end of the robotic arm, in relation to the data cartridge.

In operation, the robotic arm removes a data cartridge from a storage compartment and inserts the cartridge into an appropriate media drive where data is read to/from the data storage medium contained in the data cartridge. The robotic arm then removes the data cartridge from the media drive at the appropriate time, and returns the data cartridge to its assigned storage compartment. The storage compartment has exacting dimensions that correspond to the data cartridge because the data cartridge must be positioned in a precise manner if the robotic arm is to grasp the data cartridge without mishap. In addition, the alignment of the hand mechanism, located at the distal end of the robotic arm, in relation to the data cartridge when the data cartridge is located in either the assigned storage compartment or the media drive represents a critical factor for reliable operation of the cartridge library system. In particular, a misalignment between the robotic arm and the data cartridge can cause a transfer failure. A robotic arm attempting to insert a mis-centered data cartridge into a media drive may catch an edge of the data cartridge on an edge of the media drive. The torsion encountered when the robotic arm attempts to push the data cartridge into the media drive can twist the data cartridge sideways or even cause the data cartridge to drop from the hand mechanism of the robotic arm.

Robotic cartridge library systems provide relatively low cost access to a large amount of information. An example of this type of system includes the 4400 ACS system, which is commercially available from Storage Technology Corporation of Louisville, Colo.

The 4400 ACS system uses two concentric cylinders of cartridge storage arrays to house a large number of data cartridges. The robotic apparatus used in this system consists of a robotic arm assembly that is implemented by six independently operable servo mechanisms, which include a theta arm rotatably mounted on a support column. The robotic apparatus also includes a Z mechanism attached to the end of the theta arm, remote from the support column. The Z mechanism has coupled thereto reach, wrist and finger assemblies which perform the retrieval of the data cartridge from the storage compartment. The theta arm rotates the Z mechanism to the proper position in front-of a selected column of storage compartments in the array. The Z mechanism provides a vertical range of motion for the, reach wrist and finger assemblies to access the various vertical levels of the array of storage compartments. The robotic apparatus also includes a vision system that is equipped with illumination apparatus to generate an image of the selected data cartridge and its associated storage compartment to aid in the fine positioning of the robotic hand. This is accomplished by aligning the robotic arm with a target formed on the selected storage compartment, thereby ensuring precise orientation of the robotic hand with respect to the data cartridge stored in the selected storage compartment.

This robotic apparatus is extremely precise in its ability to locate and retrieve data cartridges. However, the mechanism used is expensive to implement. The expense of such robotic apparatus can be justified when the number of data cartridges served by such apparatus is large, but becomes prohibitive when the size of the library system is on the order of tens or even hundreds of data cartridges. Therefore, two of the problems in implementing a small or medium size cartridge library system is to reduce the dependence of such a system on the tight tolerances required by existing robotic servo mechanisms and to eliminate the need for a vision system to ensure precise alignment of the robotic hand with respect to the data cartridge.

SOLUTION

The robotic docking apparatus for a cartridge library system having a cartridge storage array overcomes these problems by providing a docking apparatus on the robotic arm that mates with corresponding features on the storage compartments and media drives. The docking apparatus enables the robotic cartridge retrieval mechanism to automatically and precisely align with the storage compartment that contains the selected data cartridge by using passive alignment mechanisms and without requiring the use of a vision system or expensive tight mechanical tolerances on the robotic arm.

The robotic docking apparatus is incorporated into the robotic arm in the form of a docking feature that protrudes from the front of the cartridge retrieval mechanism. The docking feature is of length sufficient to begin engagement of the mating docking receptacle formed in each of the storage compartments in the storage array prior to the remainder of the cartridge retrieval mechanism contacting the data cartridge stored therein. The docking feature is tapered in shape, being narrower in width at the distal end thereof, so that as the reach mechanism of the robotic arm extends the cartridge retrieval mechanism toward the storage compartment the taper of the docking feature forces the cartridge retrieval mechanism into alignment with the docking receptacle. Thus, the alignment precision is a function of extent of the reach stroke, since the further the reach mechanism extends the cartridge retrieval mechanism toward the storage compartment, the more precisely aligned is the cartridge retrieval mechanism with respect to the storage compartment. The precision required for the initial alignment of the cartridge retrieval mechanism with respect to the storage compartment is determined by the taper (lead-in) of the docking feature, with greater the taper, less critical the initial alignment required.

In addition, the docking apparatus can be implemented with a wide variety of cartridge retrieval mechanisms. The gripper mechanism of the 4400 ACS can be used or, alternatively, the simple hook mechanism disclosed in the above-noted U.S. patent application Ser. No. 08/751,183 can be used to retrieve the data cartridge. In the implementation disclosed below, the hooking mechanism is used to mate with a hooking notch formed in the housing of the data cartridge. This hooking feature provides a simple, yet positive engagement of the cartridge retrieval mechanism to the data cartridge, which enables the cartridge retrieval mechanism to withdraw the data cartridge from the storage compartment without the need to provide complex and costly gripper mechanisms. In particular, the hooking feature is part of a retractable arm which, when hooked to a data cartridge, serves to pull the data cartridge from its storage compartment and into the cartridge retrieval mechanism by sliding the data cartridge into a receptacle formed in the distal end of the cartridge retrieval mechanism. This configuration eliminates the need for complex hand mechanisms yet provides a positive engagement between the robotic arm and the data cartridge for data cartridge extraction and insertion functions.

This docking feature/receptacle apparatus is therefore completely passive and can provide precise alignment between the cartridge retrieval mechanism and the storage compartment. This docking apparatus is inexpensive and obviates the need for a vision system for robotic alignment purposes. In addition, the docking apparatus reduces the need for high mechanical tolerances in implementing the robotic and storage array mechanisms since the cartridge retrieval mechanism is self aligning via use of the docking feature.

DETAILED DESCRIPTION

Cartridge library systems are presently in widespread use for the automated storage and retrieval of data cartridges. The cartridge library systems typically include at least one array of storage compartments that stores data cartridges for presentment to a robotic arm, which robotic arm transfers data cartridges between their storage compartments and the media drives that are used to read, write, and erase data that is stored on the data storage medium contained in the data cartridge. In operation, the robotic arm removes a data cartridge from a storage compartment and inserts the cartridge into an appropriate media drive where data is read to/from the data storage medium contained in the data cartridge. The robotic arm then removes the data cartridge from the media drive at the appropriate time, and returns the data cartridge to its assigned storage compartment.

Cartridge Library System Architecture

Figure 1:
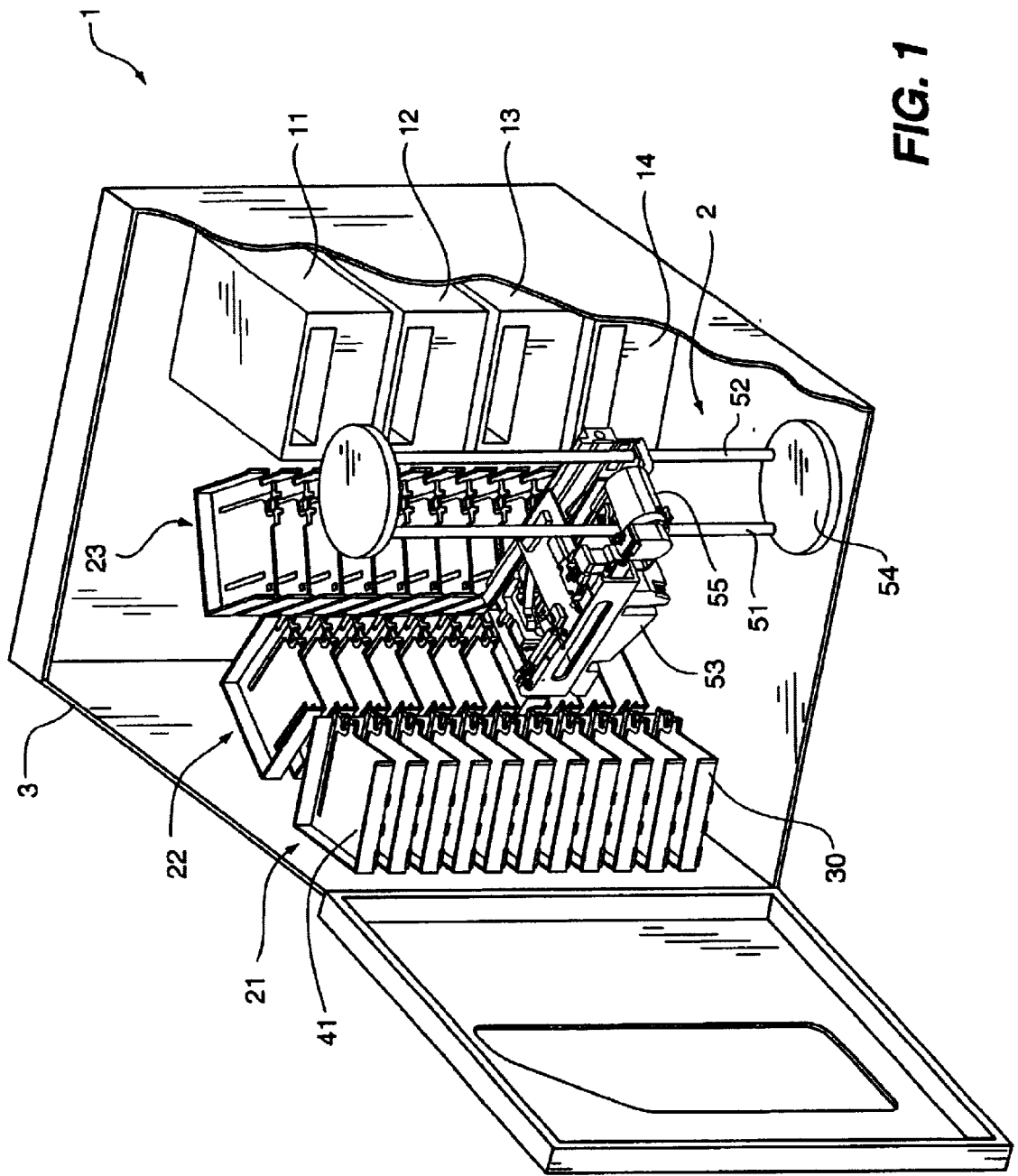
FIG. 1 illustrates a right front elevational perspective view of a cutaway of the cartridge library system that includes the robotic docking apparatus.

FIG. 1 illustrates a right front elevational perspective view of a cutaway of a cartridge library system 1 that includes the robotic docking apparatus. The cartridge library system 1 comprises a robotic arm 2 which functions to service a plurality of media drives 11–14 by accessing data cartridges that are stored in a plurality of storage arrays 21–23. Each storage array 21 comprises a plurality of vertically stacked storage compartments 30–41, each compartment capable of storing a single data cartridge of predetermined dimensions. The media drives 11–14 are typically vertically stacked and each functions in well-known fashion to read data to/from the data storage medium contained in the data cartridge. The storage arrays 21–23, media drives 11–14 and robotic arm 2 are typically enclosed in a rigid housing 3 to protect this apparatus from the ambient environment as well as to prevent users from interfering with the operation of the cartridge library system 1. The radially oriented nature of this architecture is just one of many possible alternative cartridge library system architectures and this configuration is shown for the sake of simplicity of description.

The robotic arm 2 comprises a pair of vertically oriented, parallel, spaced apart rails 51, 52 on which a cartridge retrieval mechanism 53 moves in a vertical direction. The rails 51, 52 and the cartridge retrieval mechanism 53 are mounted on a turntable 54 which functions to rotate the cartridge retrieval mechanism 53 to face one of the storage arrays 21–23 or the media drives 11–14. Thus, the turntable mechanism 54 functions to regulate the rotational movement of the cartridge retrieval mechanism 53. The cartridge retrieval mechanism 53 includes at least one motor 55 which functions to translate the cartridge retrieval mechanism 53 along the pair of rails 51, 52 in the vertical direction to position the cartridge retrieval mechanism 53 opposite a selected one of the various vertical levels of storage compartments in the storage arrays 21–23. Thus, the rotational and vertical movements of this apparatus are cooperatively operative to position the cartridge retrieval mechanism 53 opposite a selected one of the storage compartments in the cartridge library system 1. The above-noted functions and mechanisms are well known in the robotics industry and are not described in further detail herein.

Robotic Cartridge Library-System Design Issues

It is a problem in a cartridge library system, such as that shown in FIG. 1, to provide an inexpensive yet reliable cartridge retrieval mechanism to transfer data cartridges between their storage compartments and the media drives that are used to read, write, and erase data that is stored on the data storage medium contained in the data cartridges. In particular, it is a problem to reduce the dependence of the cartridge library system on the tight mechanical tolerances required of the mechanisms that are used to implement the robotics and the storage arrays and to eliminate the vision systems that are required to precisely position the hand mechanism, located at the distal end of the robotic arm, in relation to the data cartridge.

The servo mechanisms, found in prior art systems, that are used to control the rotation of the robotic arm, the vertical translation of the hand mechanism as well as the reach and gripper mechanisms that are typically found on the hand mechanism are expensive and must be constructed to tight tolerances to enable the robotic arm to precisely grasp the data cartridge stored in a selected storage compartment. In addition, each of the storage arrays must be mounted in the housing in precise relation to both the robotic arm as well as in reference to each other. Furthermore, the media drives must be mounted in the housing in precise relation to the robotic arm, the storage arrays, as well as in reference to each other. The precise orientation of this multiplicity of elements is difficult to achieve and maintain over the life of the cartridge library system, especially in view of the removable nature of the media drives and the wear that occurs on the movable elements of the cartridge library system. Thus, an improvement to this system that reduces the dependence on these precise tolerances represents a performance enhancement as well as a cost savings.

Data Cartridge

Figure 2:
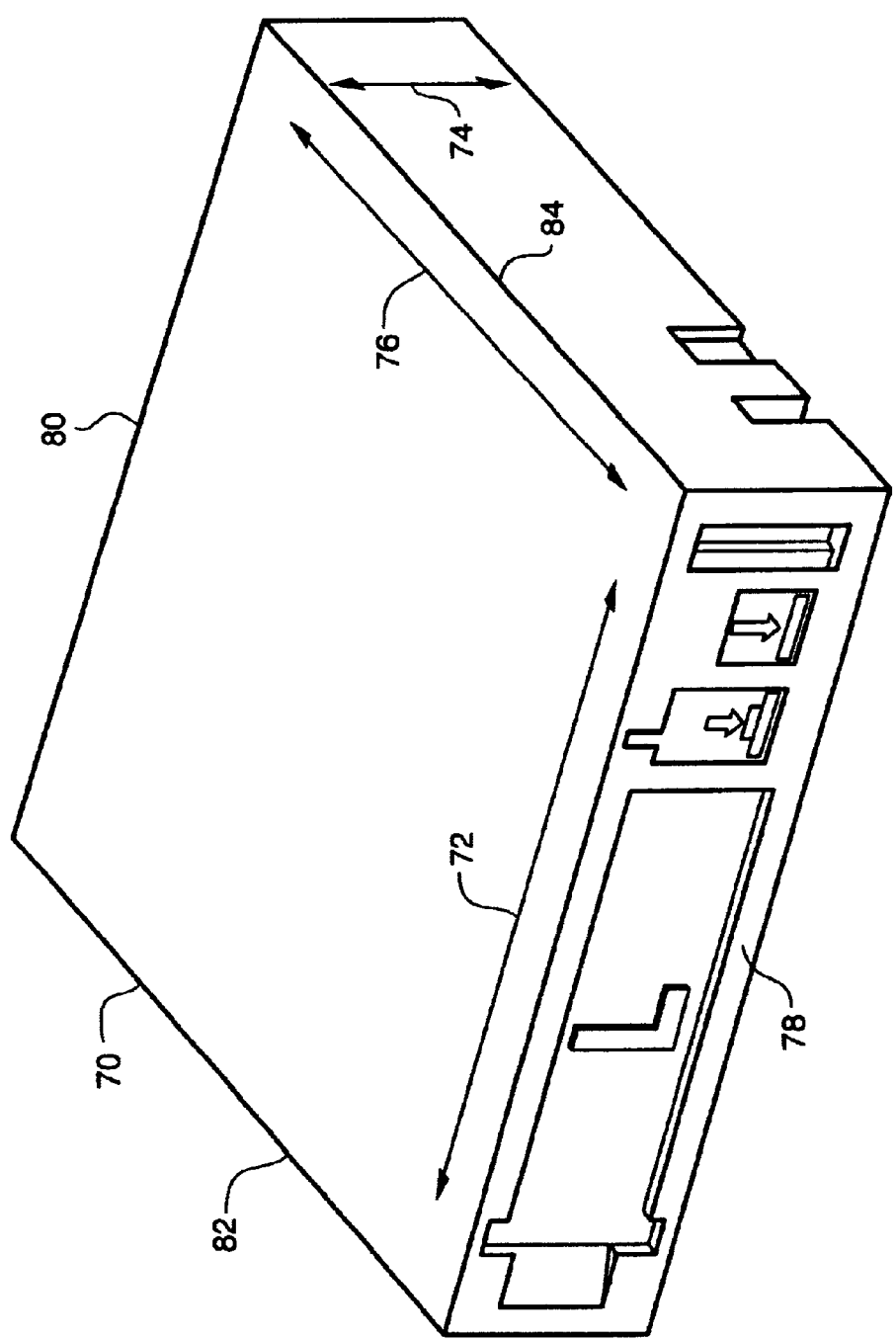
FIG. 2 illustrates a right front elevational perspective view of a data cartridge that is used in the cartridge library system of FIG. 1.

FIG. 2 illustrates a cartridge 70 that is used in conjunction with digital linear tracking tape drives manufactured by Quantum Corporation of Shrewsburg, Mass. Cartridge 70 has a width dimension following line 72 of approximately 4.150 inches, a height dimension following line 74 of approximately 1 inch, and a depth dimensions following line 76 of approximately 4.165 inches. Cartridge 70 presents a forward surface 78 at a position remote from rearward surface 80. Cartridge 70 has a rotatable side door proximal to reference numeral 82 that can be actuated to provide access to tape that is spooled within cartridge 70. Cartridge 70 is circumscribed by square corners, e.g., upper square corner 84.

Storage Array

Each of the storage arrays 21–23 include a plurality of cartridge-receiving storage compartments 30–41. Each storage compartment includes means for aligning a data cartridge in at least two dimensions with respect to the storage compartment and is preferably capable of aligning the data cartridge in three dimensions with respect to the storage compartment. The typical storage compartment has no moving parts, and is either oriented in a manner that permits gravitational forces to align the data cartridge using the storage compartment surfaces as guides or is horizontally oriented and includes a feature to prevent the data cartridge from exiting the storage compartment without the application of external force to the data cartridge. The storage array 21 preferably includes a plurality of these storage compartments 30–41. The storage compartments 30–41 are preferably connected in fixed relationship to one another. The fixed relationship preferably positions the respective data cartridges that are received within each storage compartment along a common datum line. The datum line represents a distance in space forward from the forwardmost surfaces of the respective data cartridges. The data cartridges extend forward from their storage compartments a sufficient distance to place forward surfaces of the data cartridges in contact with the datum line. The data cartridges are also centered with respect to the datum line along the width dimensions of the respective data cartridges.

Data Cartridge Hooking Apparatus

The cartridge library system of FIG. 1 is disclosed in additional detail in U.S. patent application Ser. No. 08/751,183, wherein a specific implementation of the cartridge retrieval mechanism 53 is disclosed. This cartridge retrieval mechanism 53 includes a mechanical latch arm assembly for grasping the data cartridges. The latch arm assembly is cam-actuated for pivoting between a "latching" position for engaging the cartridge and a "put" position for pushing the data cartridge out of the cartridge retrieval mechanism 53. This apparatus uses a hooking apparatus 103 to engage a mating aperture 303 formed in the housing of the data cartridge DC. The engagement of the hooking apparatus 103 with the data cartridge DC enables the reach mechanism of the cartridge retrieval mechanism 53 to pull the data cartridge DC out of the storage compartment and into the cartridge retrieval mechanism 53. A limitation of such an apparatus is that the engaging end of the hooking mechanism 103 with the mating aperture 303 formed in the housing of the data cartridge DC is dependent on the precise alignment of the cartridge retrieval mechanism 53 with the storage compartment. The robotic docking apparatus is used to provide the precise alignment in an efficient and inexpensive manner.

Robotic Docking Apparatus

Figure 3:
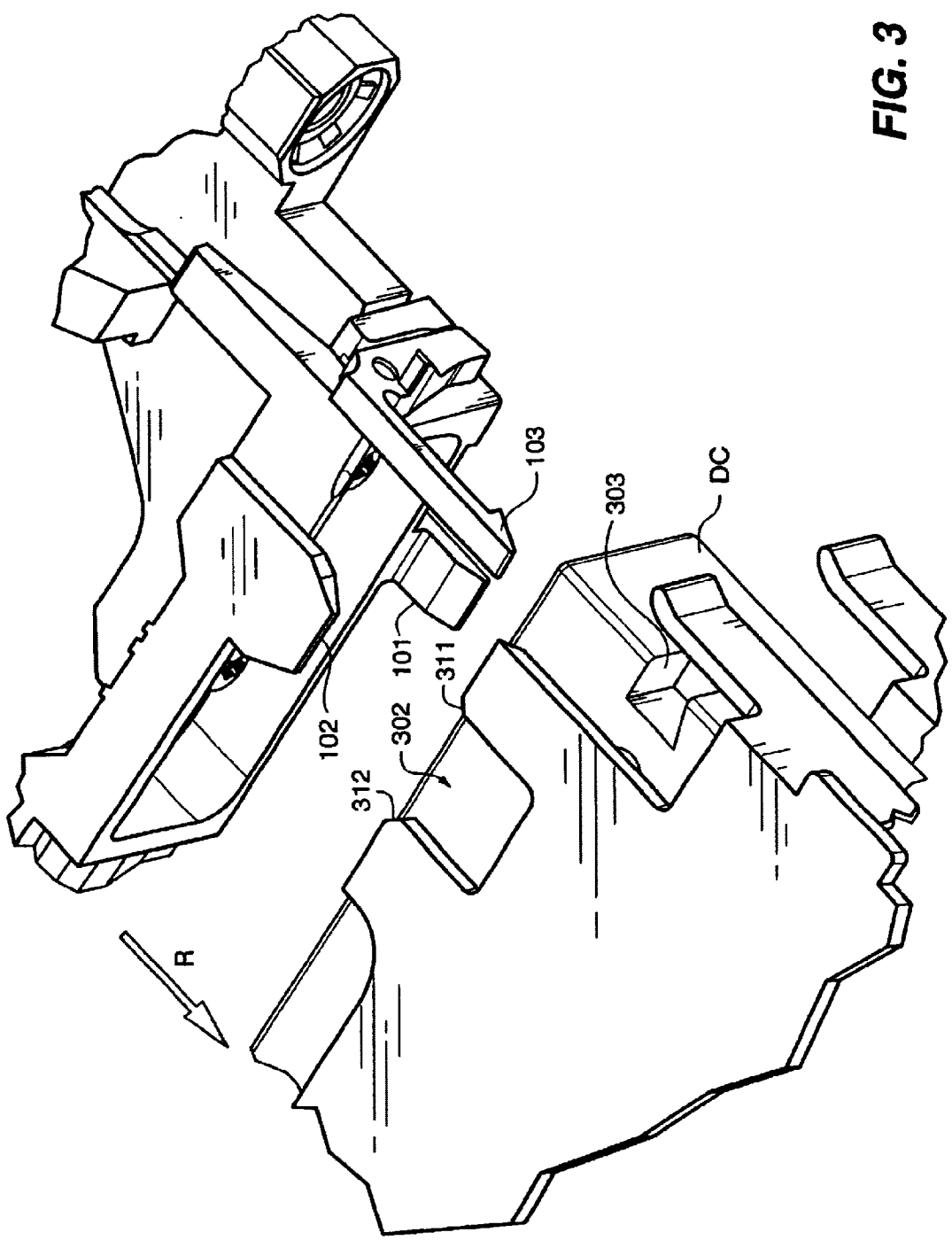
FIGS. 3 and 4 illustrate a left rear bottom and left front top elevational perspective views, respectively, of the robotic docking apparatus positioned in front of a selected storage compartment prior to retrieval of a data cartridge stored therein.
Figure 4:
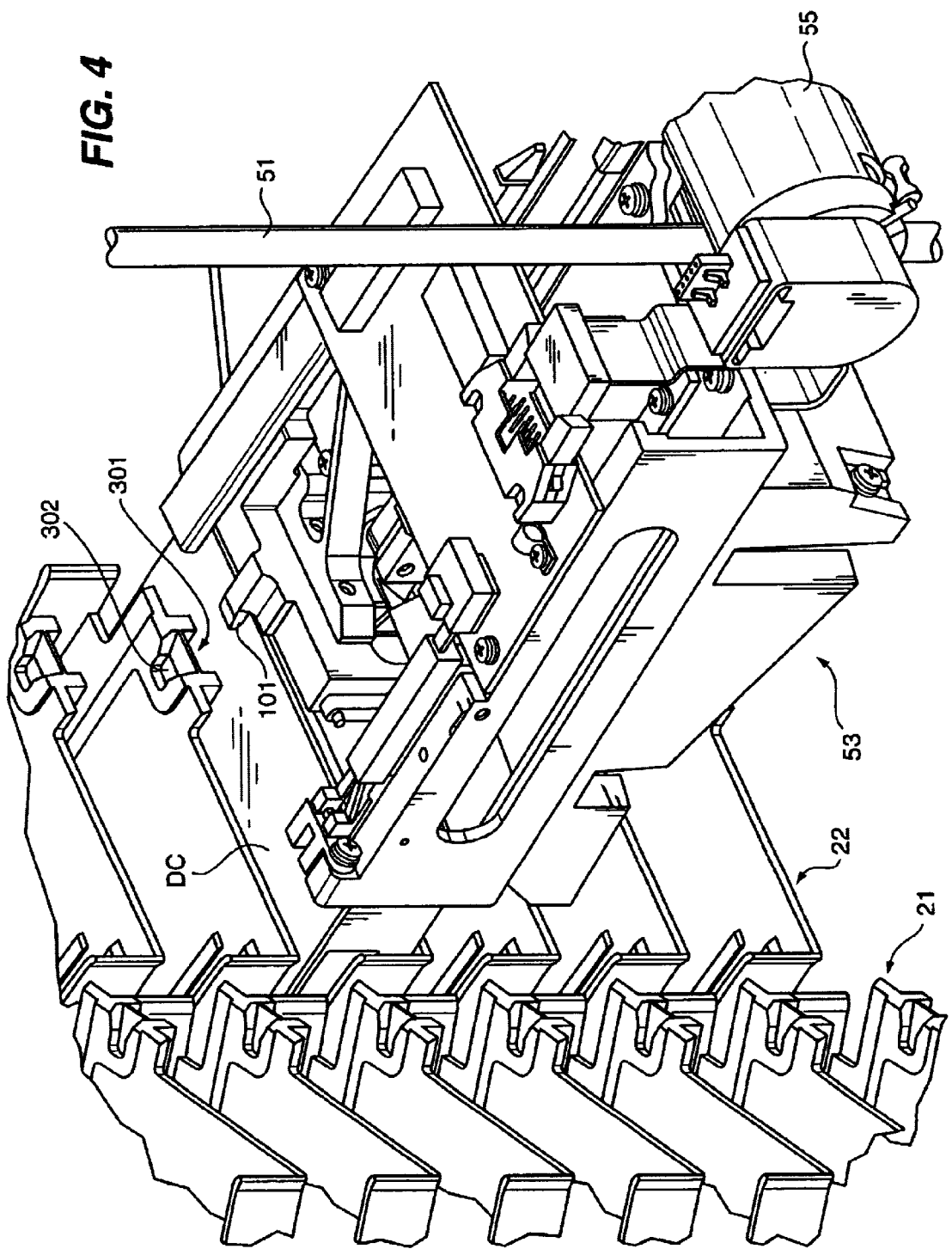
Figure 5:
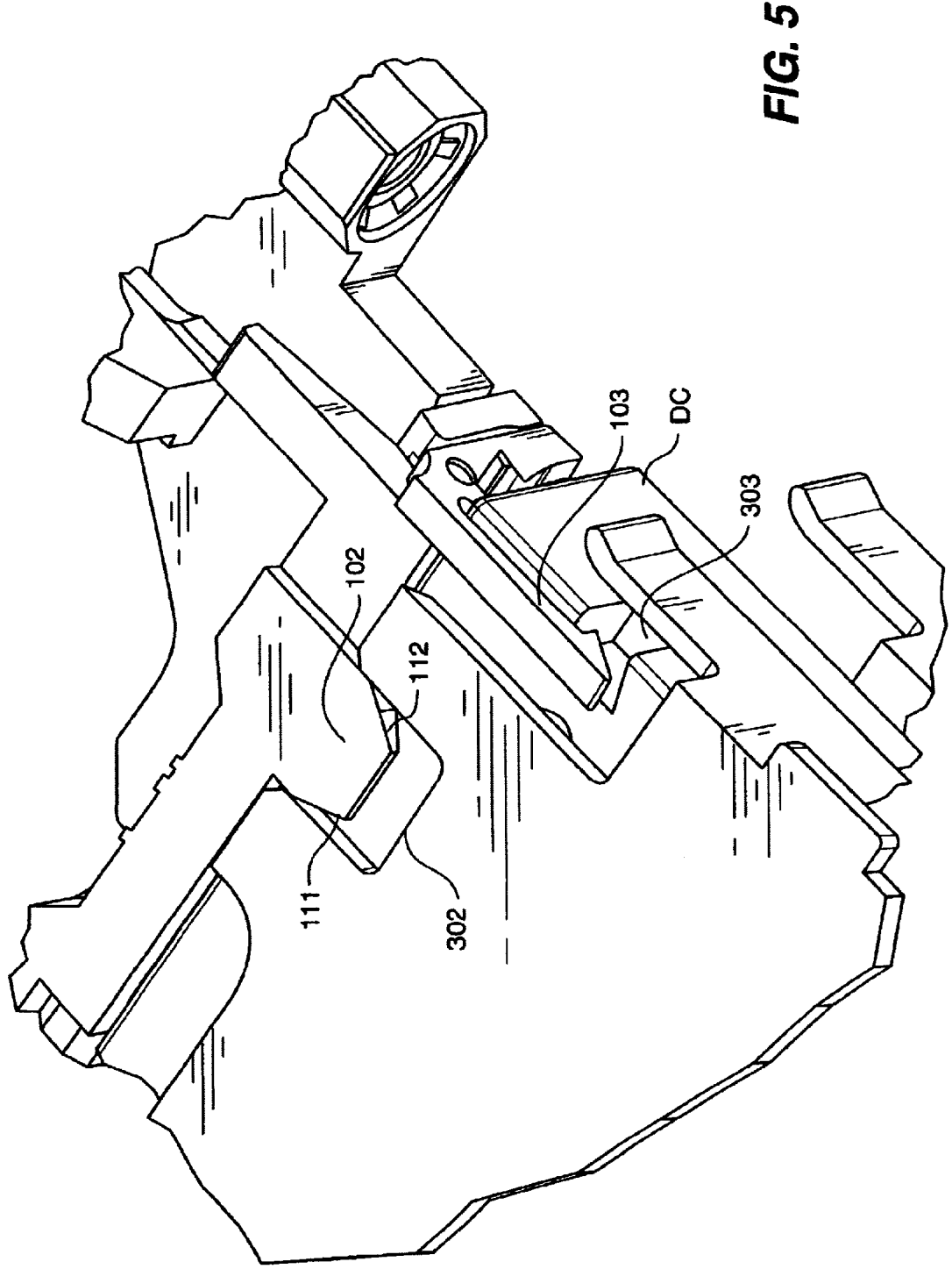
FIGS. 5 and 6 illustrate a left rear bottom and left front top elevational perspective views, respectively, of the robotic docking apparatus positioned in front of a selected storage compartment and in the process of retrieval of a data cartridge stored therein.
Figure 6:
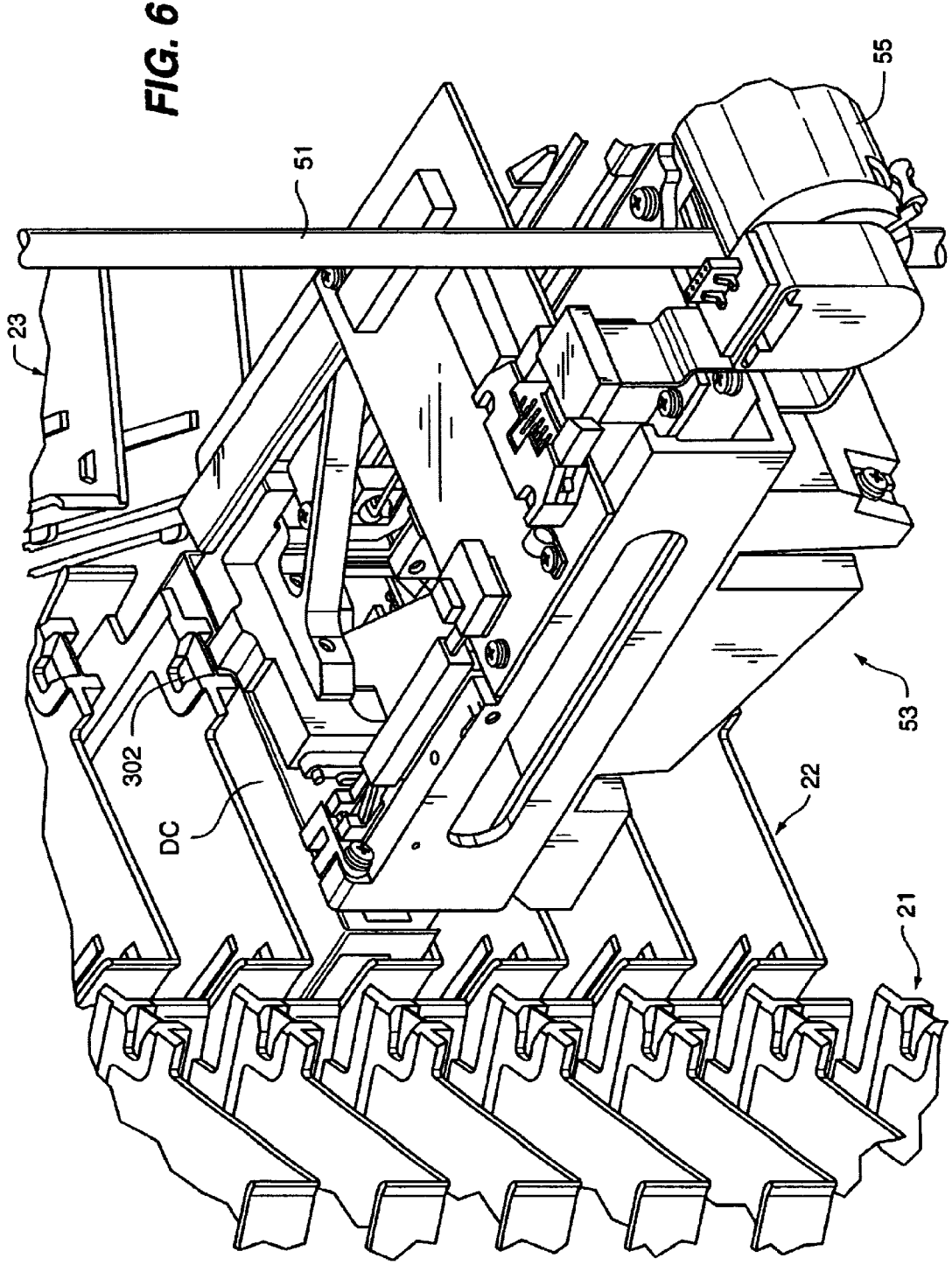
Figure 7:
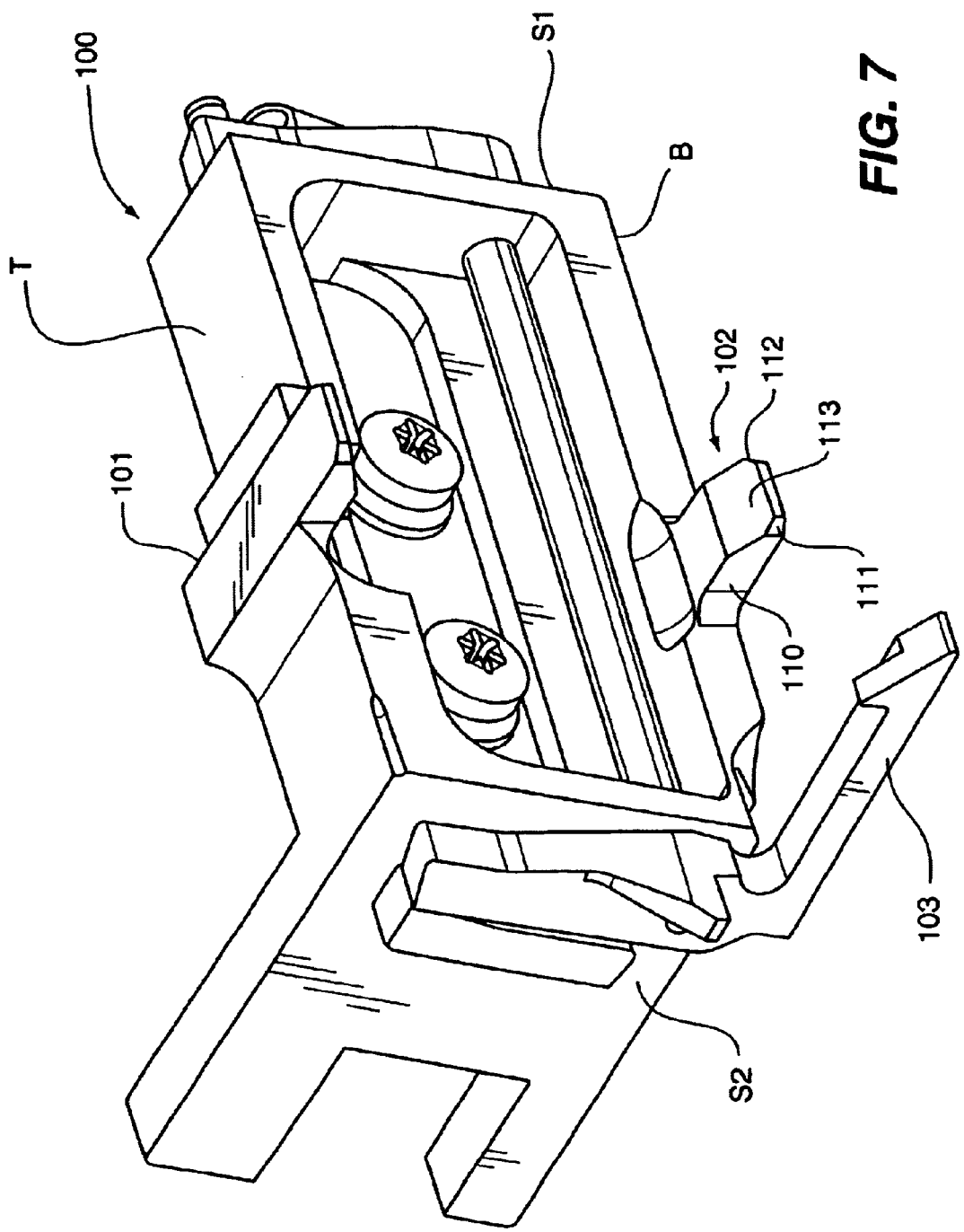
FIG. 7 illustrates the docking feature in additional detail.

FIGS. 3 and 4 illustrate a left rear bottom and left front top elevational perspective views, respectively, of the robotic docking apparatus positioned in front of a selected storage compartment prior to retrieval of a data cartridge stored therein. FIGS. 5 and 6 illustrate a left rear bottom and left front top elevational perspective views, respectively, of the robotic docking apparatus positioned in front of a selected storage compartment and in the process of retrieval of a data cartridge stored therein. These four figures illustrate the architecture and operation of the robotic docking apparatus, while FIG. 7 illustrates the docking apparatus in additional detail.

The robotic docking apparatus comprises a docking apparatus 100 that is mounted on the distal end of the cartridge retrieval mechanism 53, remote from the guide rails 51, 52. The docking apparatus 100 is typically molded in a single piece and is shown as a rectangular shaped open-centered frame having a top T, a bottom B, and two sides S1, S2. The docking features 101, 102 are shown as located substantially centered on both the top T and bottom B edges of the docking apparatus 100. The docking features 101, 102 are positioned to align with mating docking receptacles 301, 302 on the storage compartments 30–41 of the storage arrays 21–23. The selection of the number, location, size and shape of the docking features 101, 102 are matters of design choice. The docking features 101, 102 could be located one on each of the sides S1, S2 of the docking apparatus 100, or a single docking feature can be used. The centered location of the docking features 101, 102 on the top T and bottom B of the docking apparatus 100 represent another design choice. The exact implementation of the docking features 101, 102 is therefore a matter of considering a number of factors to accomplish the desired degree of positional accuracy.

The docking features 101,102 are mirror-images of each other and comprise a body 110 which has two tapered sides 111, 112 as well as an upwardly/downwardly tapering bottom/top face, respectively. The two tapered sides 111, 112 form a lead-in mechanism which mates with the corresponding two tapered sides 311, 312 formed in the docking receptacle that is formed in the storage compartment. The cartridge retrieval mechanism 53 performs the reach function by moving the distal end of its mechanism in the reach direction R (shown in FIG. 3) toward the selected data cartridge. The initial engagement of the docking features 101, 102 with their corresponding docking receptacles 301, 302 typically result in one of the tapered sides 111, 112 contacting a corresponding tapered side 311, 312. As the cartridge retrieval mechanism 53 continues the retrieval stroke, the two contacting sides exert a force on the cartridge retrieval mechanism 53 in the rotational direction, acting to center the docking features 101, 102 in their corresponding docking receptacles 301, 302. In addition, the tapered face 113 of the docking features 101, 102 perform a similar centering operation in the Z direction.

At this point in the cartridge retrieval operation of the cartridge library system 1, the mechanisms used to perform the rotational and Z direction positioning of the cartridge retrieval mechanism 53 are in a rest state and the force exerted in the rotational and Z directions by the docking apparatus causes the turntable 54 to rotate and the cartridge retrieval mechanism 53 to move vertically to a position centered on the storage compartment. In cartridge library systems that store data representative of the precise spatial location of the storage compartments, this centered position can be read out of the servo tachometers of the turntable 54 and the cartridge retrieval mechanism 53 to thereby update the positional data stored in the memory of the cartridge library system.

As the cartridge retrieval mechanism 53 completes its reach stroke, the docking features 101, 102 seat in their corresponding docking receptacles 301, 302 and the hooking mechanism 103 seats in the corresponding aperture 303 formed in the data cartridge DC as shown in FIGS. 5 and 6. At this point, the hooking apparatus 103 is fully engaged in the aperture 303 in the data cartridge DC and the cartridge removal operation can proceed.

The same docking apparatus can be implemented on each of the media drives 11–14 to thereby ensure centering of the cartridge retrieval mechanism 53 with respect to the data cartridge aperture formed in the media drives 11–14.

SUMMARY

The docking apparatus comprises a docking feature that is formed on the distal end of the robotic arm and which functions to mate with corresponding apertures on the array of storage compartments to ensure accurate alignment of the cartridge retrieval mechanism with the data cartridge. The docking feature and its corresponding docking receptacle can be a single pair of elements or can be replicated more than once on the distal end of the cartridge retrieval mechanism. The location of the docking apparatus can be along the top and/or bottom edges and/or the sides of the cartridge retrieval mechanism and need not be centered along the selected edge(s). In addition, the docking features themselves can include a pair of tapered edges to align the cartridge retrieval mechanism in the horizontal (rotational) direction with respect to the storage compartment. The docking features can optionally include additional tapered edges to perform the alignment function in the Z direction. The accuracy required in the initial positioning of the cartridge retrieval mechanism is a function of the degree of taper provided by the docking apparatus, with less accuracy being required for a larger taper. Thus, this apparatus functions to render the cartridge retrieval mechanism automatically self-aligning with the storage compartments without the need for powered elements.

We claim:

1. A robotic docking alignment apparatus used to align a cartridge retrieval mechanism with a cartridge receiving location, said robotic docking alignment apparatus comprising:

at least one docking feature formed on an end of said cartridge retrieval mechanism proximate said cartridge receiving location, wherein said at least one docking feature comprises a member outwardly extending from said end of said cartridge retrieval mechanism proximate said cartridge receiving location, said member comprising two faces, located on opposite sides of said member and tapered inwardly toward each other; and at least one docking receptacle formed on an end of said cartridge receiving location proximate said cartridge retrieval mechanism, wherein said at least one docking receptacle comprises an aperture inwardly extending from said end of said cartridge receiving location proximate said cartridge retrieval mechanism, said aperture comprising two faces, located on opposite sides of said aperture and tapered inwardly toward each other;

said at least one docking feature engagable with said at least one docking receptacle for aligning said cartridge retrieval mechanism in at least two dimensions with respect to said cartridge receiving location.

2. A robotic docking alignment apparatus used to align a cartridge retrieval mechanism with a cartridge receiving location, said robotic docking alignment apparatus comprising:

at least one docking feature formed on an end of said cartridge retrieval mechanism proximate said cartridge receiving location, said at least one docking feature comprising a member outwardly extending from said end of said cartridge retrieval mechanism proximate said cartridge receiving location, said member comprising two faces, located on opposite sides of said member and tapered inwardly toward each other and a third face, located on a side of said member which extends between said two faces, and tapered inwardly from said end of said cartridge retrieval mechanism proximate said cartridge receiving location in a direction away from said end of said cartridge retrieval mechanism proximate said cartridge receiving location; and at least one docking receptacle formed on an end of said cartridge receiving location proximate said cartridge retrieval mechanism.

3. A robotic docking alignment apparatus used to align a cartridge retrieval mechanism with a cartridge receiving location, said robotic docking alignment apparatus comprising:

at least one docking feature formed on an end of said cartridge retrieval mechanism proximate said cartridge receiving location; and at least one docking receptacle formed on an end of said cartridge receiving location proximate said cartridge retrieval mechanism, said at least one docking receptacle comprising an aperture inwardly extending from said end of said cartridge receiving location proximate said cartridge retrieval mechanism, said aperture comprising two faces, located on opposite sides of said aperture and tapered inwardly toward each other and a third face, located on a side of said aperture which extends between said two faces, and tapered inwardly from said end of said cartridge receiving location proximate said cartridge retrieval mechanism in a direction away from said end of said cartridge receiving location proximate said cartridge retrieval mechanism.

4. A robotic docking alignment apparatus used to align a cartridge retrieval mechanism with a cartridge receiving location, said robotic docking alignment apparatus comprising:

at least one docking feature formed on an end of said cartridge retrieval mechanism proximate said cartridge receiving location, wherein said at least one docking feature comprises two members outwardly extending from and being located on opposite sides of said end of said cartridge retrieval mechanism proximate said cartridge receiving location, wherein said two members are centered in a horizontal direction, one on each of said opposite sides of said end of said cartridge retrieval mechanism proximate said cartridge receiving location; and at least one docking receptacle formed on an end of said cartridge receiving location proximate said cartridge retrieval mechanism, wherein said at least one docking receptacle comprises two receptacles inwardly extending from and being located on opposite sides of said end of said cartridge receiving location proximate said cartridge retrieval mechanism;

said at least one docking feature engagable with said at least one docking receptacle for aligning said cartridge retrieval mechanism in at least two dimensions with respect to said cartridge receiving location.

5. The apparatus as set forth in claim 4 wherein said two receptacles are centered in a horizontal direction, one on each of said opposite sides of said cartridge receiving location proximate said end of said cartridge retrieval mechanism.

\* \* \* \* \*